(12) United States Patent
Kueter et al.

(10) Patent No.: US 11,845,477 B2
(45) Date of Patent: Dec. 19, 2023

(54) BOGIE OF A RAIL VEHICLE

(71) Applicants: SIEMENS MOBILITY GMBH, Munich (DE); SIEMENS MOBILITY AUSTRIA GMBH, Vienna (AT)

(72) Inventors: Christian Kueter, Stattegg (AT); Andreas Schaefer-Enkeler, Roettenbach (DE); Martin Teichmann, Graz (AT); Christoph Adam, Nuremberg (DE); Olaf Koerner, Nuremberg (DE); Peter Seitz, Pommelsbrunn (DE)

(73) Assignees: Siemens Mobility GmbH, Munich (DE); Siemens Mobility Austria GmbH, Wein (AT)

( * ) Notice: Subject to any disclaimer, the term of this patent is extended or adjusted under 35 U.S.C. 154(b) by 745 days.

(21) Appl. No.: 16/962,577

(22) PCT Filed: Jan. 3, 2019

(86) PCT No.: PCT/EP2019/050070
§ 371 (c)(1),
(2) Date: Jul. 16, 2020

(87) PCT Pub. No.: WO2019/141518
PCT Pub. Date: Jul. 25, 2019

(65) Prior Publication Data
US 2020/0398871 A1 Dec. 24, 2020

(30) Foreign Application Priority Data

Jan. 16, 2018 (EP) ..................................... 18151837

(51) Int. Cl.
*B61C 9/50* (2006.01)
*B61D 17/02* (2006.01)
(Continued)

(52) U.S. Cl.
CPC ................ *B61C 9/50* (2013.01); *B61D 17/02* (2013.01); *B61F 3/14* (2013.01); *H02K 1/32* (2013.01); *B60L 2200/26* (2013.01)

(58) Field of Classification Search
CPC .. B61C 9/50; B61D 17/02; B61F 3/14; H02K 1/32; B60L 2200/26
See application file for complete search history.

(56) References Cited

U.S. PATENT DOCUMENTS 6,868,793 B2   3/2005   Hoffman et al.
8,479,658 B2   7/2013   Langerwisch et al.
(Continued)

FOREIGN PATENT DOCUMENTS

CN      1886287 A     12/2006
CN    101557143 A     10/2009
(Continued)

*Primary Examiner* — Robert J McCarry, Jr.
(74) *Attorney, Agent, or Firm* — Laurence A. Greenberg; Werner H. Stemer; Ralph E. Locher

(57) ABSTRACT

A bogie of a rail vehicle has at least one wheelset with two oppositely situated wheels that are rigidly connected to one another, a wheelset bearing arrangement of the wheelset within the two wheels, a traction motor which directly drives the wheelset, and an aerodynamic paneling enclosure of the bogie. The traction motor is a permanently excited synchronous motor with liquid cooling.

7 Claims, 4 Drawing Sheets

(51) Int. Cl.
*B61F 3/14* (2006.01)
*H02K 1/32* (2006.01)

(56) References Cited

U.S. PATENT DOCUMENTS

| | | |
|---|---|---|
| 9,908,538 B2 | 3/2018 | Kreuzweger et al. |
| 10,099,707 B2 | 10/2018 | Koerner et al. |
| 2002/0070615 A1 | 6/2002 | Jakoby et al. |
| 2007/0120428 A1 | 5/2007 | Pfannschmidt |
| 2009/0267426 A1 | 10/2009 | Graner et al. |

FOREIGN PATENT DOCUMENTS

| | | | | |
|---|---|---|---|---|
| CN | 202034857 U | 11/2011 | | |
| CN | 102624121 A | 8/2012 | | |
| CN | 1022769356 A | 11/2012 | | |
| CN | 204761178 U | 11/2015 | | |
| CN | 105680609 A | 6/2016 | | |
| CN | 106602765 A | 4/2017 | | |
| CN | 106712367 A | 5/2017 | | |
| CN | 206442202 U | 8/2017 | | |
| CN | 107276271 A | 10/2017 | | |
| DE | 102011012454 A1 | 8/2012 | | |
| EP | 1320478 A1 | 6/2003 | | |
| EP | 2883775 A1 | 6/2015 | | |
| EP | 2883775 A1 * | 6/2015 | ............. | B61C 17/00 |
| JP | H11255119 A | 9/1999 | | |
| RU | 2562815 C2 | 9/2015 | | |
| WO | 2010086201 A1 | 8/2010 | | |
| WO | 2012069269 A1 | 5/2012 | | |
| WO | 2014206643 A1 | 12/2014 | | |
| WO | WO-2014206643 A1 * | 12/2014 | ............. | B61D 17/02 |

\* cited by examiner

BOGIE OF A RAIL VEHICLE

BACKGROUND OF THE INVENTION

Field of the Invention

The invention relates to a bogie of a rail vehicle with at least one wheelset with two opposing rigidly interconnected wheels, wherein a wheelset bearing of the wheelset is effected within the two wheels and the traction motor is arranged between the wheels of the wheelset.

Bogies of rail vehicles have traction motors, which are designed as asynchronous machines with self-ventilation or forced ventilation or permanently excited synchronous machines, which drive the wheelsets of the bogie via a transmission. The transmissions are cooled by the head wind which flows through the underfloor region. In the bogie region, self-ventilated traction motors draw in the cooling air and release it back to the surrounding environment. Forced-ventilated traction motors also release their heated cooling air to the surrounding environment in the bogie region. At higher speeds, the head wind then dissipates the heated cooling air of said traction motors in the transmission region.

In rail vehicles in the higher speed range, however, the aerodynamics, in particular also those of the bogie region, are significant for the energy consumption of the rail vehicles.

For this reason, as known from WO 2014/206643 A1 and WO 2010/086201 A1, enclosures are provided for the bogie in order to improve the aerodynamics.

Although this is advantageous for aerodynamic reasons, releasing the heat losses of the traction motors may be difficult or no longer even possible.

Furthermore, in rail vehicles the wheelset shafts are mounted outside the wheels.

SUMMARY OF THE INVENTION

On this basis, the object underlying the invention is that of providing a bogie with at least one traction motor for rail vehicles, in particular for high-speed trains, which is also able to allow heat dissipation of the at least one traction motor should the bogie have an enclosure.

The object set is achieved by a bogie of a rail vehicle with:
- at least one wheelset with two opposing rigidly interconnected wheels,
- a wheelset bearing of the wheelset within the two wheels,
- a traction motor, which drives the wheelset directly, wherein the traction motor is a permanently excited synchronous motor with liquid cooling,
- an aerodynamic enclosure of the bogie.

According to the invention, in a bogie with internally mounted wheelset shaft, a full enclosure is now provided which, in particular when viewed from the front, can be designed to be comparatively narrow, as the external bearing of the wheelset has been laid inwardly, i.e. between the wheels of the wheelset, and thus allows more space and parts for an aerodynamic enclosure of the bogie.

Furthermore, this means that the overall air resistance of the rail vehicle is reduced and contributes towards a significant reduction in the energy consumption of the vehicle. Particularly suitable traction motors are drive motors which operate comparatively efficiently and only require a comparatively low amount of cooling.

According to the invention, a liquid-cooled permanently excited synchronous motor without transmission in a fully enclosed, internally mounted running gear is therefore suitable for achieving the object set above.

Permanently excited synchronous machines are comparatively well suited for liquid cooling, as the rotor losses to be dissipated are considerably lower than in asynchronous machines, for example.

Furthermore, a heat dissipation of the rotor by a liquid cooling inter alia could only be realized in a comparatively technically complex manner due to the rotating seals.

In order to also exclude the heat source of a transmission, according to the invention a permanently excited synchronous motor is used as a direct drive, so that a cooling of the transmission is dispensed with. Direct drives of this kind may be sensibly realized with permanently excited synchronous motors, but other asynchronous motors are also conceivable.

In this context, the direct drive is coupled to the wheelset shaft via a coupling. The direct drive is either arranged about the wheelset shaft, in which case the wheelset shaft engages through a hollow shaft of a rotor of the direct drive. Here, the direct drive drives the wheelset by means of a cardan quill shaft coupling.

Alternatively, the direct drive may also be arranged substantially paraxially next to the wheelset shaft, for example.

By eliminating the transmission, construction volume within the internally mounted running gear is therefore gained and the additional thermal load due to the transmission is avoided.

The liquid cooling of the traction motor is arranged in and/or on the stator of said traction motor. In this context, the liquid cooling jacket has cooling coils which run in the circumferential direction or meander paraxially. Furthermore, in addition or as an alternative, cooling tubes may also be arranged in the laminated core of the stator.

Via a liquid cooling in or on the stator housing, in particular a water-cooling jacket, which is situated on the rear side of the stator and between air-guiding ducts of the internal cooling circuit of the traction motor, it is now possible for the traction motor(s) also to be sufficiently cooled from the running gear region through which ambient air does not flow due to the comparatively thick enclosure of the bogie.

The quantity of heat absorbed by the water or another cooling liquid from the rotor and/or stator is released to the ambient air via a cooling installation within the rail vehicle and/or via the cooling installation of the current converter.

A compact and enclosed traction motor is therefore present, wherein in particular a further reduction of the diameter of the stator and axially shorter winding heads are obtained due to the direct drive having a high pole density.

The invention as well as advantageous embodiments of the invention are explained in greater detail on the basis of schematic representations of exemplary embodiments, in which:

DETAILED DESCRIPTION OF THE INVENTION

Figure 1:
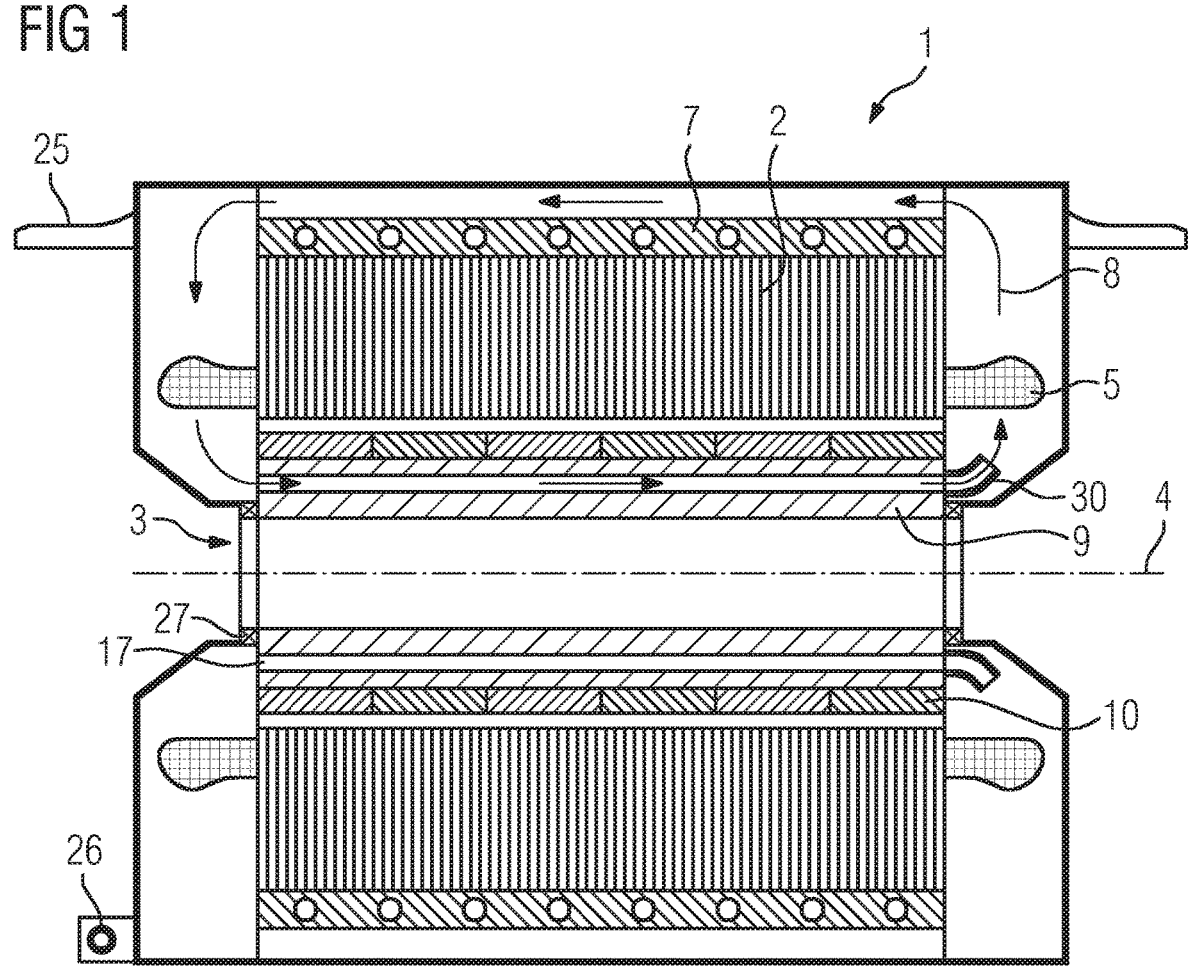
FIG. 1 shows a schematic traction motor.

FIG. 1 shows a schematic representation of a longitudinal section of a permanently excited synchronous motor as traction motor 1 of a rail vehicle (not shown in further detail), in particular high-speed train, with a laminated core layered in the axial direction, which forms the basis of a stator 2. Arranged on the rear side of the stator 2, i.e. the side of the stator 2 facing away from an air gap of the traction motor 1, is a water jacket cooling 7, in order to be able to dissipate the heat loss, which arises during operation of the traction motor 1, from the stator 2. In this case, the cooling tubes of the water jacket cooling 7 substantially run in the circumferential direction.

Arranged in slots of the stator 2 is a winding system which, by way of electromagnetic interaction with a rotor 3, which is provided with permanent magnets 10, causes a rotation of the rotor 3 about an axis 4. The winding system forms winding heads 5 at the end faces of the stator 2. The permanent magnets 10 of the rotor 3 are arranged as embedded permanent magnets 10 in recesses of the rotor 3 running substantially axially or as surface magnets on the rotor 3, where they are fixed by a bandage for example. The rotor 3 forms a hollow shaft 9, through which the wheelset shaft 16 runs. Furthermore, cooling ducts 17 for an internal cooling circuit 8 are also provided in the rotor 3.

In this context, the internal cooling circuit 8 is maintained by fans 30, in particular radial fans. The rotor 3 causes comparatively low losses, meaning that a traction motor is also conceivable which has no internal cooling circuit 8, but rather merely dissipates the losses from the traction motor 1 by way of a water jacket cooling 7 at the rear of the stator 2.

The internal cooling circuit 8, due to the guidance of the air flow, also serves to dissipate heat out from the two end face-side winding heads 5 of the stator 2 and to homogenize the temperature within the traction motor 1.

The water jacket cooling 7 now causes a cooling of the stator 2, and via the internal cooling circuit 8 a cooling of the rotor 3 and the end face-side winding heads 5. This serves to evenly distribute the temperature within the traction motor 1 and the motor bearings 27.

The housing of the electric machine 1 is braced against the rotor 3 via motor bearings 27. Furthermore, the housing is positioned via a torque support 26 and a motor brace 25 in the bogie (not shown in further detail).

Figure 2:
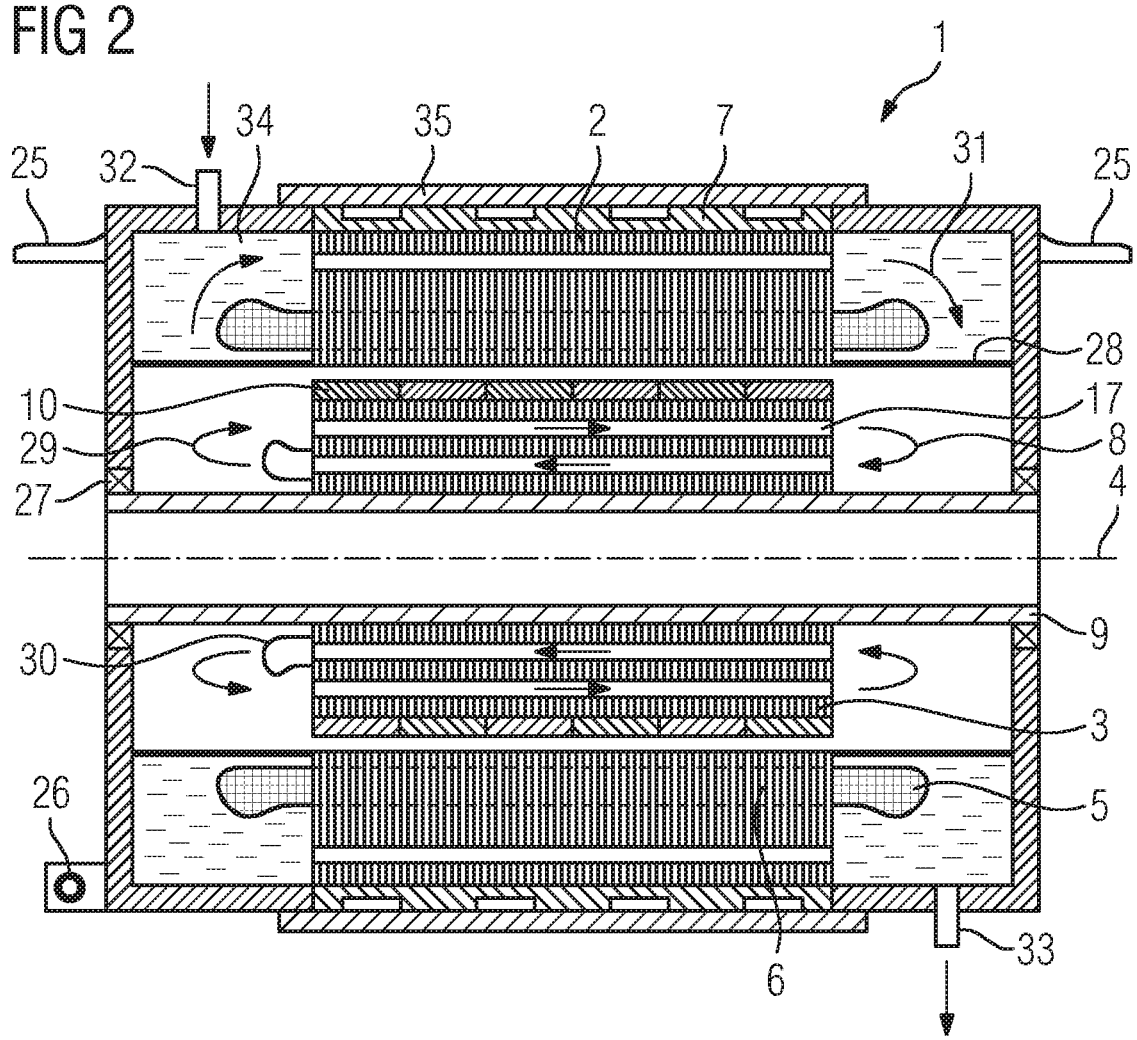
FIG. 2 shows a further traction motor.

FIG. 2 shows an alternative embodiment of the electric machine 1, which is likewise designed as a permanently excited synchronous motor, as in FIG. 1. The liquid cooling jacket, which likewise may be designed as a water cooling jacket 7, here is substantially formed from two axially superimposed cylinders, wherein the radially inner cylinder has circumferential recesses which guide the water. The stator 2 is separated from the rotor 3 by a motor can 28, so that the stator 2 can additionally be cooled by an insulating coolant 34, e.g. oil, via an inlet 32 and an outlet 33. In this context, the laminated core of the stator 2 runs through axial cooling ducts.

An internal cooling circuit 8, the air recirculation of which is maintained by a fan 30, in particular radial fan, is in the rotor 3. A recooling of the internal cooling circuit 8 takes place in contact with the surrounding parts, in particular also on the motor can 28.

The rotor 3 is designed as a hollow shaft 9 and is connected to a coupling 12 in a rotationally fixed manner, which in turn is connected to the wheelset shaft 3 in a fixed manner, so that the torque of the traction motor 1 can be transferred to the wheelset shaft. A cardan quill shaft coupling is particularly suitable for this purpose.

In principle, reinforcing elements 14 may be provided within the rotor 3, which intrinsically stabilize the rotor 3. Wheelset bearings 15 within the wheels 11 permit a rotation of the wheelset shaft 16.

The housing of the electric machine 1 is braced against the rotor 3 via motor bearings 27. Furthermore, the housing is positioned via a torque support 26 and a motor brace 25 in the bogie (not shown in further detail).

Figure 3:
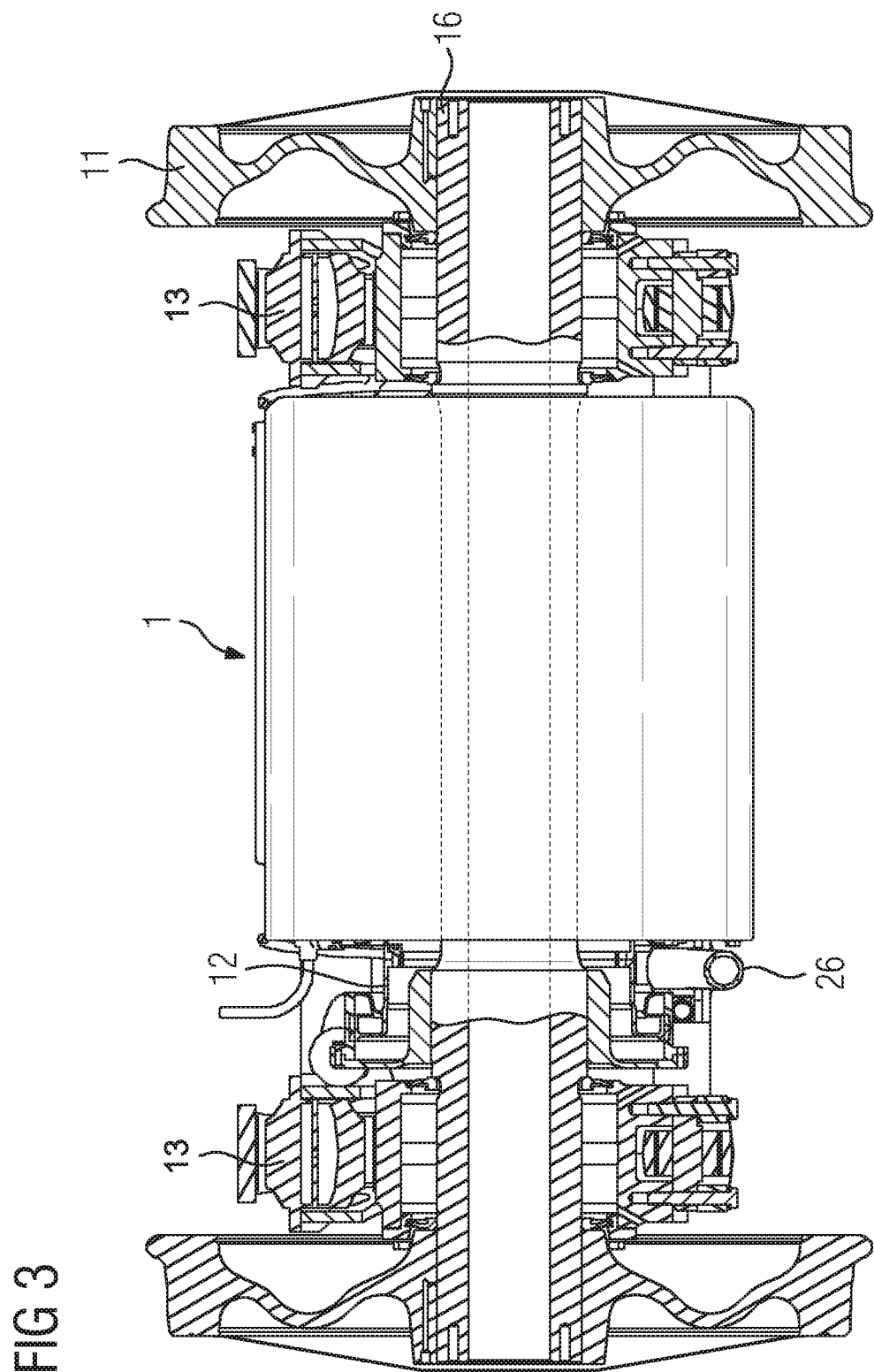
FIG. 3 shows the arrangement of a traction motor on a wheelset shaft.

FIG. 3 shows a wheelset 24 with an electric traction motor 1, which may be designed according to FIG. 1 or FIG. 2. Via a coupling 12, in particular cardan quill shaft coupling, the drive torque of the traction motor 1 is conducted to the wheelset shaft 16. Likewise, the wheelset bearing is arranged between the wheels 11.

The electric traction motor 1 is therefore fully enclosed and effectively protected from moisture and contamination.

Figure 4:
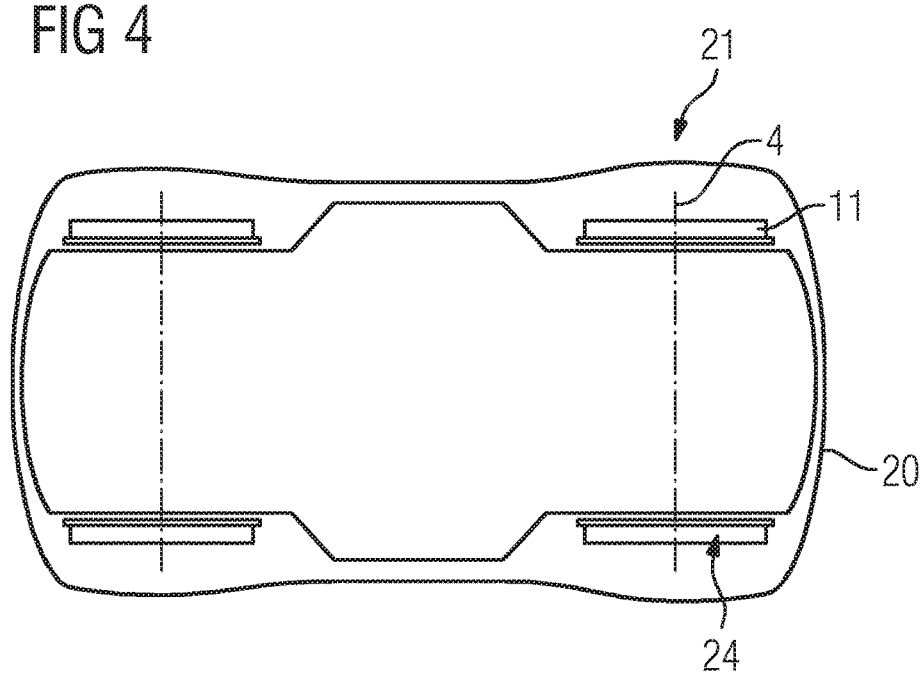
FIGS. 4, 5 show schematic representations of enclosures of the bogie and the arrangement of the traction motors.

FIG. 4 shows a schematic representation of a bogie 21, the wheelsets 24 of which with the respective wheels 11, which can be rotated about the axes 4. Furthermore, an enclosure 20 is shown at the underbody, at the side regions and at the front and rear region of the bogie 21. This produces an aerodynamic design of the bogie 21. This may, however, lead to the waste heat problems of a traction motor 1 described above. According to the invention, the cooling system is now configured such that the waste heat, in particular of the traction motor 1, is guided out from the bogie region.

Figure 5:
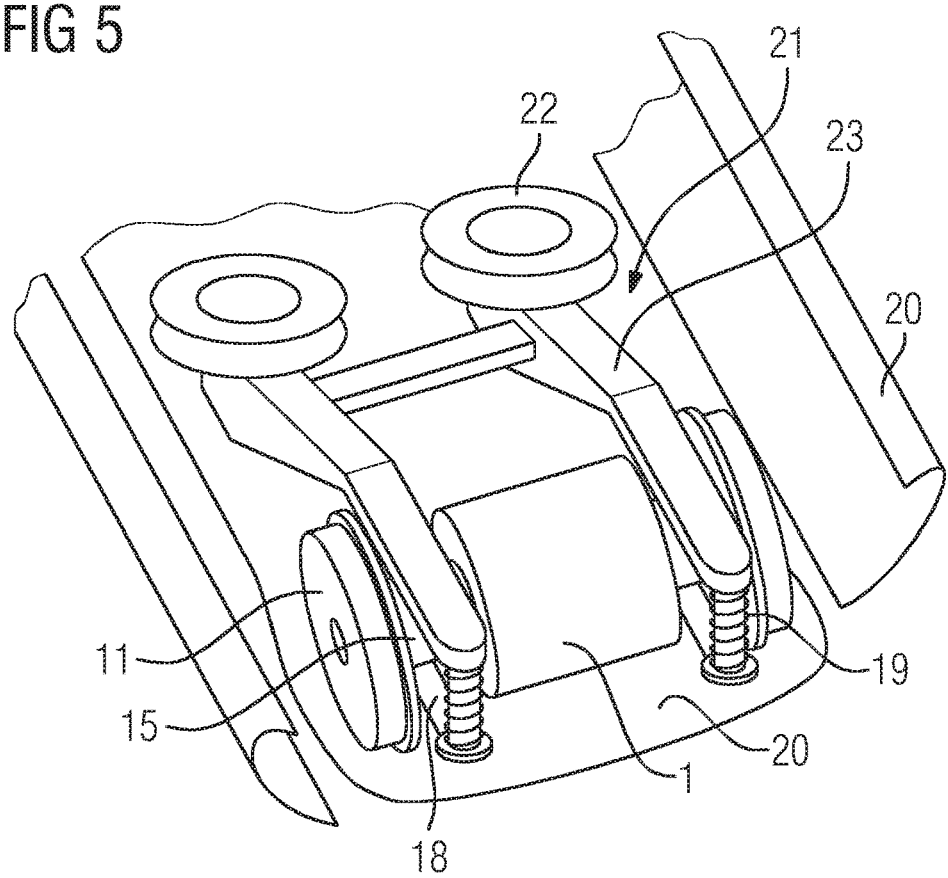

FIG. 5 shows a schematic perspective representation of a wheelset 24 of a bogie 21, the bogie frame 23 of which is braced via a spring 19 against a support 18, also referred to as wheelset bearing swing arm, and is arranged between the wheels 11 of the traction motor 1. Secondary springs 22 brace the bogie 21 against a vehicle body or rail vehicle body (not shown in further detail).

Shell-shaped enclosure elements both on the sides and in the direction of travel, as well as on the side of the bogie 21 facing away from the direction of travel, form the enclosure 20. This attempts to keep the gap dimensions between the individual enclosure elements as low as possible, in order to also obtain functional aerodynamics in the turned-out or not turned-out state of the bogie 21. The underside of the bogie 21 is also enclosed, but has recesses (not shown in further detail) for the wheels 11, in order to establish the wheel-rail contact.

By way of the embodiment of the traction motor 1 according to the invention as a permanently excited synchronous machine with the types of cooling described, in particular water jacket cooling and/or motor can cooling of the stator 2 and/or internal cooling circuit 8, wherein in this context the heat loss is guided outside the region of the bogie 21, a fully functional and aerodynamically designed bogie 21 is now created, which is primarily suitable for high-speed applications.

The bogie 21 described according to the invention, with one or more permanently excited synchronous motors, which are arranged about the wheelset shaft 15 as a direct drive, have a liquid cooling of the stator 2, have an enclosed internal cooling circuit 8 and have a wheelset bearing axially within the wheels 11, therefore enabling a particularly aerodynamic enclosure of said bogie 21.

In principle, other motor types may also be used as traction motor 1, for example such as asynchronous motors with squirrel-cage rotors or permanently excited transverse flux machines as direct drives encompassing the wheelset shaft. Likewise, these exemplary motor types may be arranged paraxially and/or connected to the wheelset shaft via a transmission. Likewise, the wheelset shaft 15 may also be arranged axially outside the wheelset shaft 16. The cooling concept accordingly may also have to provide a liquid cooling of the rotor 3. In this case, it is always crucial that the waste heat of the drive is as low as possible and is dissipated out from the fully enclosed bogie region, which is to be designed in an aerodynamic manner.

The invention claimed is:

1. A bogie of a rail vehicle, the bogie comprising:
    at least one wheelset with two opposing, rigidly interconnected wheels;
    a wheelset bearing of said at least one wheelset within said two wheels;
    a traction motor configured to drive said wheelset directly, said traction motor being a permanently excited synchronous motor with liquid cooling;
    said liquid cooling being effected by a liquid cooling jacket, and said traction motor having a closed internal cooling circuit to be recooled at said liquid cooling jacket; and
    an aerodynamic enclosure of the bogie, said enclosure being a full enclosure formed of shell-shaped enclosure elements on an underside, side regions, a front region and a rear region of the bogie, and said enclosure element on the underside being formed with recesses for said wheels of said wheelset.

2. The bogie according to claim 1, wherein said closed internal cooling circuit is to be recooled at a motor can of a stator of said traction motor.

3. The bogie according to claim 2, wherein said liquid cooling jacket cooling is arranged between a rear side of the stator of said traction motor and the internal cooling circuit.

4. The bogie according to claim 3, wherein said internal cooling circuit includes outer air-guiding ducts.

5. The bogie according to claim 2, further comprising a motor can disposed to separate said stator of said traction motor from a rotor of said traction motor, enabling said stator to be cooled by way of an insulating liquid.

6. A rail vehicle, comprising at least one bogie according to claim 1, and wherein at least one recooling unit of the liquid cooling is arranged in and/or on the rail vehicle.

7. The rail vehicle according to claim 6, configured as a high-speed train.

* * * * *